United States Patent [19]

Guzik

[11] 4,345,399
[45] Aug. 24, 1982

[54] VIBRASONIC FISHING LURE

[76] Inventor: Chet Guzik, 8520 SW. 122nd St., Miami, Fla. 33156

[21] Appl. No.: 166,354

[22] Filed: Jul. 7, 1980

Related U.S. Application Data

[63] Continuation-in-part of Ser. No. 91,370, Jan. 2, 1980, abandoned.

[51] Int. Cl.$^3$ .............................................. A01K 85/01
[52] U.S. Cl. .................................. 43/42.06; 43/42.31
[58] Field of Search ................. 43/42.06, 42.31, 42.24, 43/42.26, 17.1

[56] References Cited

U.S. PATENT DOCUMENTS

| | | | |
|---|---|---|---|
| 1,540,586 | 6/1925 | Adam | 43/42.26 |
| 2,468,877 | 5/1949 | Horton | 43/42.24 |
| 2,977,705 | 4/1961 | Busnel | 43/42.31 |
| 3,071,884 | 1/1963 | Peltz | 43/42.31 |
| 3,088,240 | 5/1963 | Beilsten | 43/26.2 |
| 3,449,852 | 6/1969 | Mitchell | 43/42.06 |
| 3,507,070 | 4/1970 | Rossello | 43/42.06 |
| 3,521,394 | 7/1970 | Winterberger | 43/42.06 |

*Primary Examiner*—Nicholas P. Godici
*Attorney, Agent, or Firm*—Robert J. Van Der Wall

[57] ABSTRACT

An elongated tubular body portion of the fishing lure is provided to define a through passageway for a continuous flow of water when the fishing lure is being trolled behind a boat or being retrieved as by a rod and reel, or in any manner is caused to move lengthwisely through the water. A pair of longitudinally extending fish hooks extend outwardly from a rear end portion of the tubular body and a pair of through holes are provided in the tubular body, the pairs of fish hooks and holes preferably being in a diametrically opposed aligned relation. An elastic member diametrically spans the tubular body and extends outwardly through the holes, engaging the outer surfaces of the tubular body portion in proximity to the through holes. The elastic member includes shoulders formed therein with a distance between such shoulders that is less than the diameter of the tubular body portion, thereby maintaining a predetermined amount of tension in the elastic member when the same is inserted into the through holes in the tubular body portion of the fishing lure. A water flow through the tube produces a vibrasonic effect on the elastic span portion. At least one end of the elastic member extends substantially beyond the outer surface of the tubular body portion in a manner so it will be bent backward and moved by the flow of water outside of the tubular body portion when the lure is moved through the water, thereby simulating the movement and shape of the fin of a fish.

18 Claims, 11 Drawing Figures

VIBRASONIC FISHING LURE

CROSS-REFERENCE TO ANOTHER APPLICATION

This application is a continuation-in-part of the Inventor's earlier application entitled "Vibrasonic Fishing Lure," Ser. No. 091,370, filed Jan. 2, 1980, now abandoned. It was copending with said earlier application and claims the Jan. 2, 1980 filing date as to the common subject matter.

BACKGROUND OF THE PRESENT INVENTION

The present invention relates to the field of fishing lures, and more particularly to a sonic fishing lure which employs an elastic member disposed relative to the through chamber of a tubular body of the lure to create a vibrasonic effect when the lure is caused to move longitudinally through the water. The elastic member is preferably a premolded element which can be interchanged with similar elements having different dimensions, to produce varying tension and different vibrasonic effects when the lure is moved through the water.

U.S. Pat. No. 3,071,884 to K. L. Peltz discloses a fishing lure which employs a pair of spaced apart diametric posts to support an axial shaft within a generally tubular body of the lure. A vane is journaled on the axial shaft and rotates in response to water passing through the tubular body, this causes one of the diametric posts to vibrate in a vertical direction to create noise.

U.S. Pat. No. 3,521,394 to L. Wintersberger discloses a fishing lure with a longitudinally extending shaft through the length of a contoured tubular body portion. Turbine blades are fixed between the shaft and tubular body to cause the entire lure to rotate and produce noise. Exterior twisted blades are intended to augment the rotational movement of the lure body. However, neither of the foregoing references recite the use of an elastic member to create vibrasonic effect to attract fish, and both include rigid parts that move relative to each other and can wear out or jam in use.

U.S. Pat. Nos. 2,952,092 to E. R. Swenson; 2,983,065 to W. T. Ferguson, et al.; 2,944,362 to D. E. Kreeger; 2,793,460 to N. D. Mutchler; 2,229,369 to H. J. Buettner; 1,657,164 to C. L. Kendall; and 1,540,586 to L. D. Adams all disclose various types of fishing lures: however, none of these patents disclose or recite any sonic capabilities.

Therefore, one of the principal objects of the present invention is to provide a fishing lure having a body portion comprised of a tubular body member defining a longitudinal flow through chamber for the water, a diametric span across the chamber of a strip of a suitable elastic material such as rubber, at least a pair of hooks, carried by a rear end portion of the tube and means to attach the diametric span relative to the body member in a properly tensioned condition.

Another principal object of the present invention is to provide a fishing lure which can accommodate a variety of different elastic members which may be interchanged to produce a variety of sonic effects.

A related object of the invention is to provide a fishing lure which accommodates elastic members having a substantially planar surface which may be rotated by the user in relation to the direction of water flow through the lure to also vary the sonic effects of the lure when the lure is caused to move through the water.

Another object of the invention is to provide a vibrasonic fishing lure without parts that move relative to each other to avoid wear, jamming, and failure because of corrosion.

A further object of the invention is to provide a vibrasonic fishing lure where the sound created can be readily and inexpensively altered by the user in accordance with the type of fish being sought.

One object of the invention is to permit the user of a vibrasonic fishing lure to maintain its sonic benefits throughout a long useful life of the lure by providing a design which can substitute a common rubber band as the sound creating mechanism.

An additional object of the invention is to furnish a resonant and sound directing chamber and sound creating mechanism of a vibrasonic fishing lure.

Other objects and advantages will become apparent to those skilled in the art upon reading the following description and upon reference to the drawings.

DETAILED DESCRIPTION

Figure 1:
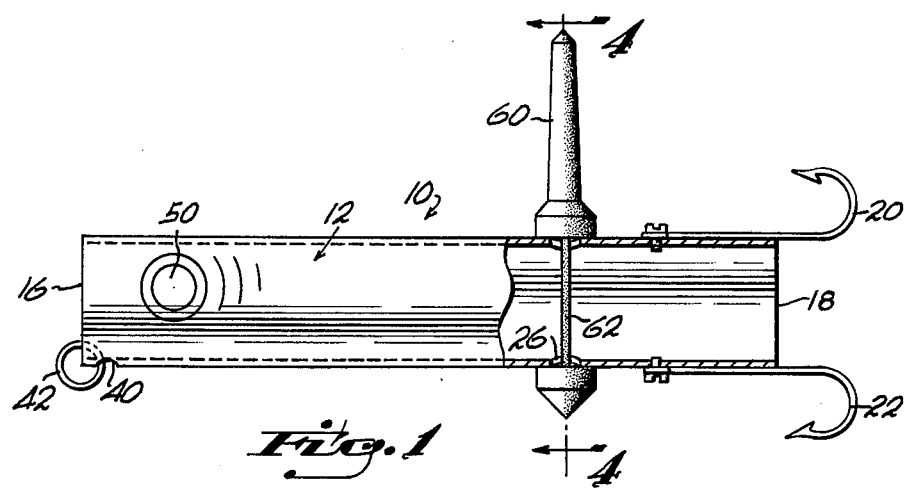
FIG. 1 is a side elevation view of the fishing lure of the present invention with parts broken away to better illustrate the invention.

With reference to the drawings, and particularly to FIG. 1, the fishing lure of the present invention, indicated generally at 10, includes an elongated tubular body portion 12, defining a longitudinally extending through chamber 14 from an open front end 16 through an open back end 18. A pair of hooks 20, 22, having a shank and curved barb bearing segment are fixed by any suitable attachment means such as small screws 24 to the outer rear end portion of the tubular body 12. Hooks 20, 22 may be attached to the body 12 in any other appropriate manner such as by an elongated through bolt and nut, rivets, spot welding, etc.

Figure 7:
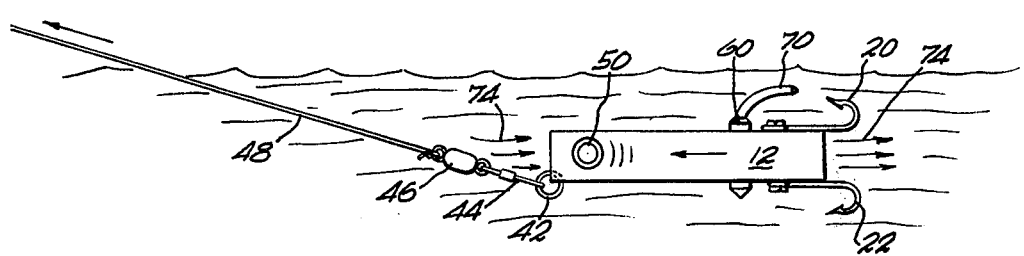
FIG. 7 is a side elevation view, illustrating the lure in use.

Forwardly of the hooks 20, 22, a pair of generally diametrically aligned through holes 24, 26 provided through the tubular body 12, are, in a preferred form, in alignment with the respective hooks 20, 22. An elastic member 60 is disposed through holes 24, 26, providing a diametrically extended central span portion 62 in its installed and tensioned condition of FIG. 1. The front end of the tubular body is provided with a hole, such as 40, to receive attachment means such as loop 42, for attachment to the remainder of the fishing apparatus as illustrated in FIG. 7. The exterior surface may be finished in any desired color, and include any characteristic design or fish-simulating indicia such as the eye 50, and the tubular body 12 may be formed from a variety of appropriate materials such as metal, plastic, or wood.

Figures 2, 3, 4, 5:
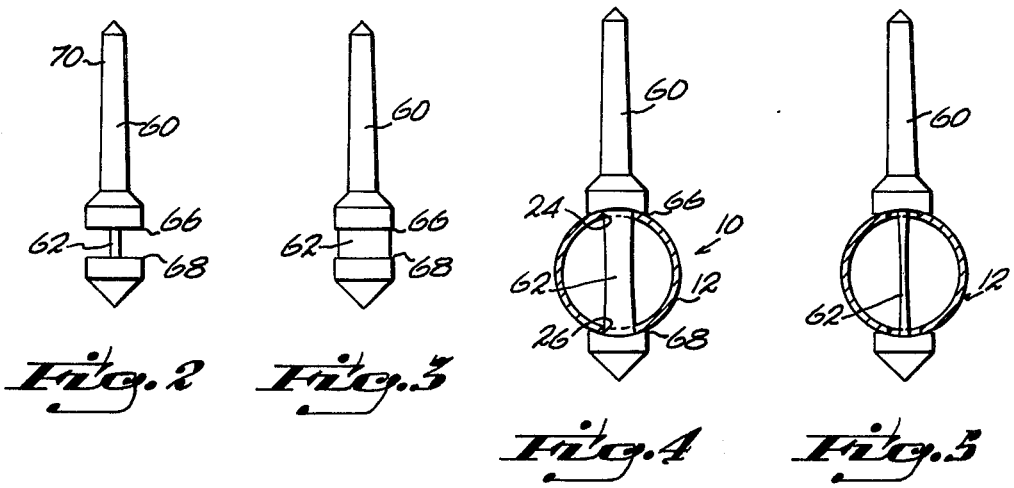
FIG. 2 is a side elevation view of a typical elastic member which may be interchanged in the fishing lure with others of similar configuration.
FIG. 3 is a front elevation view of the same elastic member shown in FIG. 2.
FIG. 4 is a cross-section view of the fishing lure, taken along Line 4—4 of FIG. 1, and showing the elastic member of FIG. 2, inserted into the lure and tensioned by its placement therein.
FIG. 5 is a cross-section view, taken along the Line 5—5 of FIG. 1 and showing the same elastic member illustrated in FIG. 2, except that the same is rotated 90 degrees within the lure to expose its planar surface, tensioned by insertion into the lure at right angles to that position illustrated in FIG. 4.

Turning to FIG. 2, elastic member 60 is shown in its relaxed (untensioned) form prior to insertion into the lure. Elastic member 60 is formed with shoulders 66 and 68 at opposed ends of the central span portion 62. It will be noted that the distance between shoulders 66 and 68 in the untensioned form of elastic member 60 is substantially less than the diameter of tubular body 12 of FIG. 1. The distance between shoulders 66 and 68 may be varied with various interchangeable elastic members 60 to vary the tension in the central span portion 62 when elastic member 60 is inserted into tubular body portion 12. In this manner, a variety of different sonic effects may be obtained by varying the amount of tension in central span portion 62. Central span portion 62 may also be varied in dimension to create further variations in the sonic effects. The upwardly extending portion 70 of elastic member 60 is resilient so that it will bend backwards and move when the lure is caused to travel through the water in the manner illustrated in FIG. 7.

In FIG. 3, the same elastic member 60, as shown in FIG. 2 is illustrated at right angles to the position shown in FIG. 2. It will be observed that the central span portion 62 may be of wider dimension in this view, since the same may be of a substantially planar configuration. The wider dimension of central span portion 62 will generally, however, be kept less than the diameter of through holes 24 and 26 of FIG. 1.

FIG. 4 shows the cross-section of the lure 10, with elastic member 60 inserted into tubular body portion 12 and with central span portion 62 both tensioned, as shown by the longer dimension of the central span portion, and located to present its planar surface perpendicular to the axis of tubular body portion 12. Tension is maintained in central span portion 62 by engagement of shoulders 66 and 68, with the outer surfaces of the tubular body portion 12 in proximity to through holes 24 and 26.

In FIG. 5, the same elastic member 60, as illustrated in FIGS. 2-4, is shown tensioned in tubular body portion 12, but with the central span portion 62 turned so that its planar surface is parallel to the axis of tubular body portion 12. Clearly the different positions of elastic member 60 between that shown in FIGS. 4 and 5 will produce different sonic effects. Just as clearly, the position of elastic member 60 may be rotated to an infinite number of positions, varying between that shown in FIGS. 4 and 5, to produce differing sonic effects. Tension on central span portion 62 maintains the elastic member 60 in whichever position is established by the user.

Figure 6:
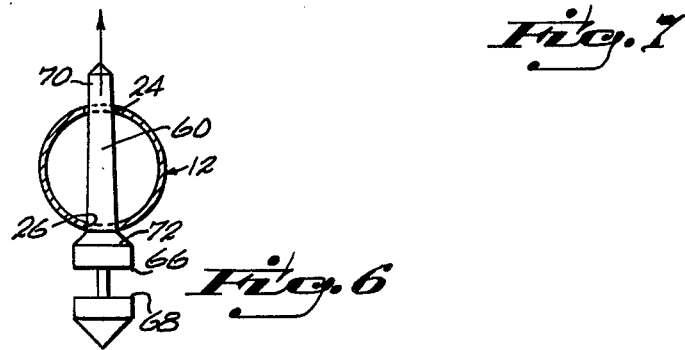
FIG. 6 is a further cross-section of the lure, taken along the Line 5—5 of FIG. 1, and illustrating the insertion of a typical elastic member into the lure in the position shown in FIG. 5.

FIG. 6 illustrates the technique for insertion of elastic member 60 into tubular body portion 12. The upper end 70 of elastic member 60 is of greater length than the diameter of tubular body 12. It may, therefore, be inserted through both holes 24 and 26 of tubular body portion 12 and grasped between the thumb and forefinger of the user. The upper surface 72 of shoulder 66 is tapered to permit shoulder 66 to be deflected and drawn through through-hole 26 initially and through-hole 24 thereafter. Shoulder 68, presenting a flat surface, will not pass through hole 26. Optionally, tapered surface 72, on top of shoulder 66, may be coated with a lubricant-type substance to facilitate more rapid insertion into tubular body 12.

In FIG. 7, the preferred embodiment of the invention is illustrated in use. Loop 42 may be engaged to a conventional clasp 44 and swivel 46, which in turn is connected to a fishing line 48. Fishing line 48 is pulled through the water as by a fishing boat trolling, thereby creating a flow of water as at 74, through tubular body portion 12. The movement of the water flow over the tensioned elastic member 60 creates a vibrasonic effect, drawing fish to the lure which may be caught by hooks 20 and 22, deployed for that purpose. Movement of the lure through the water bends backward the upper portion 70 of elastic member 60 and moves same, thereby simulating the fin of a fish as it swims through the water. As noted above, an eye 50, and other fish simulating indicia may be employed on the exterior surface of tubular body 12.

While the form of the elastic member illustrated in FIGS. 1 through 5 is preferred, it is clear that a conventional rubber band could be substituted therefor by placing one end of same over hook 20 of FIG. 1, threading the same rubber band through holes 24 and 26 and then placing the opposite end of the rubber band over hook 22 of FIG. 1, thereby creating a tensioned central span portion in the middle of the rubber band. By selecting rubber bands of various lengths, different sonic effects may be obtained.

Figure 8:
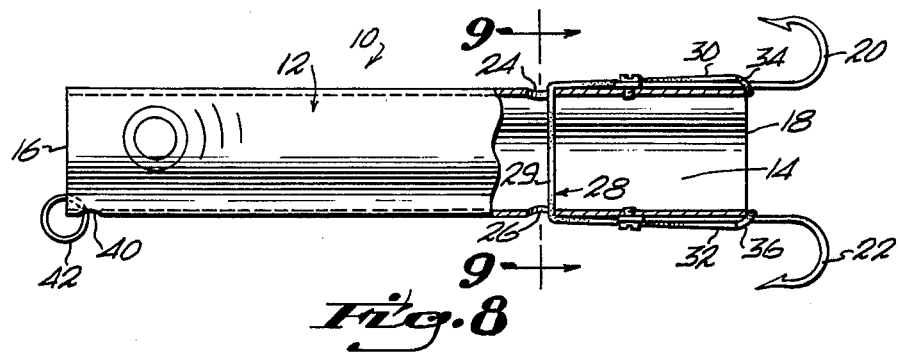
FIG. 8 is a side elevational view of an alternative embodiment of the fishing lure of the present invention with parts broken away to better illustrate the invention.

Accordingly, and turning now to FIG. 8, an alternative embodiment of the present invention is disclosed, generally indicated at 10, which includes a substantially similar elongated tubular body portion 12 defining a longitudinally extending through chamber 14 from an open front end 16 through an open back end 18. A pair of hooks, 20,22, having a shank and curved barb bearing segment are fixed by any suitable attachment means such as small screws 24 to the outer rear end portion of the tubular body 12.

Figure 9:
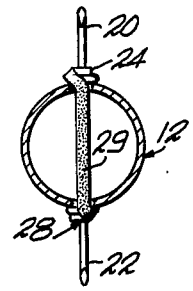
FIG. 9 is cross-sectional view taken along line 2—2 of FIG. 8.
Figure 11:
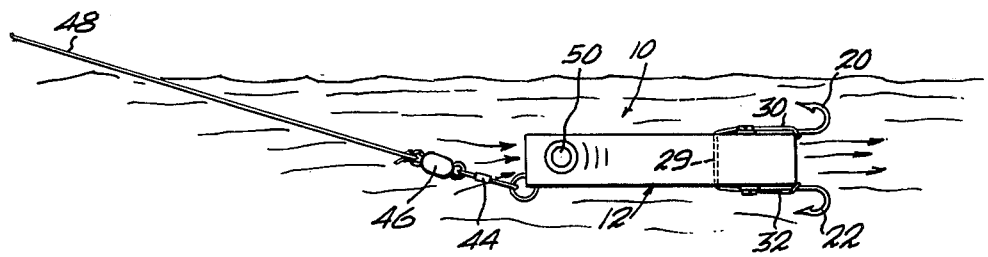
FIG. 11 is a view and side elevation, illustrating the alternative embodiment of the lure in use.

Similarly, forwardly of the hooks 20, 22, a pair of generally diametrically aligned through holes 24, 26 provided through the tubular body 12, are in alignment with the respective hooks 20, 22. An elastic strip member 28 is disposed through holes 24, 26 providing a diametrically extended central span portion 29 in its installed condition of FIG. 8. A pair of rearward extensions 30, 32 from diametric span portion 29, terminate in respective end loops 34, 36, through which the hooks 20, 22 are engaged as in FIGS. 8 and 9. The elastic strip member 28 is formed of a suitable elastic material such as rubber and has a predetermined degree of elasticity as related to a predetermined length to produce a maximum sonic effect when the lure 10 is pulled through the water as in FIG. 11.

Figure 10:
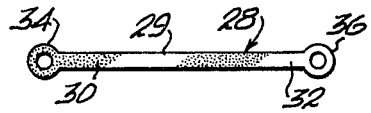
FIG. 10 is a plan view of one type of elastic sonic member employed by this alternative embodiment of the present invention.

The elastic strip 28 as illustrated in FIG. 10 is one form, but a conventional rubber band may be extended through holes 24, 26 with the ends thereof engaged about hooks 20, 22.

Having described the presently preferred embodiments of the invention, it should be understood that various changes in construction and arrangement will be apparent to those skilled in the art and are fully contemplated here without departing from the true spirit of the invention. Accordingly, there are covered all alternatives, modifications and equivalents as may be included with the spirit and scope of the invention as defined solely by the appended claims.

What is claimed is:

1. A fishing lure comprising:
   a tubular body defining an axial interior chamber;
   means to create sonic effects including a strip of resilient material secured within, and spanning under the tension, the interior chamber in a position to react vibrasonically to the movement of water axially through said interior chamber; and
   hook means connected to the tubular body.

2. The fishing lure of claim 1, wherein the hook means comprises:
   at least one hook connected to a trailing end portion of said tubular body.

3. The fishing lure of claim 1, wherein the hook means comprises:
   a plurality of hooks connected to, and disposed in spaced relation about a periphery of, the trailing end portion of the tubular body.

4. The fishing lure of claim 3, wherein each hook includes a shank overlying and connected to an outer face of the trailing end portion of the tubular body and including a curved barb bearing segment extending rearwardly beyond said trailing end portion.

5. The fishing lure of claim 1, which includes a plurality of holes in the tubular body in spaced relation thereabout.

6. The fishing lure of claim 5, wherein the resilient material secured within, and spanning under tension, the interior chamber further comprises:
   an elastic member, having a central span portion disposed between two shoulders, said shoulders in engagement with outer surfaces of the tubular body in proximity with the holes therein.

7. The fishing lure of claim 6, wherein the central span portion is substantially planar.

8. The fishing lure of claim 7, wherein the width dimension of the central span portion is less than the diameter of the holes in the tubular body, thereby permitting rotation of the central span portion plane with respect to an axis of the tubular body.

9. The fishing lure of claim 5, wherein the resilient material is an elastic strip member having end loops, with a first end loop placed over one hook, a central portion of said elastic strip member inserted through the holes in the tubular body and a second end loop of the elastic strip member placed over a second hook.

10. The fishing lure of claim 1, wherein the tubular body is round in cross-section.

11. The fishing lure of claim 1, wherein the tubular body bears fish simulating indicia.

12. The fishing lure of claim 9 wherein the elastic strip member is a conventional rubber band.

13. A fishing lure which comprises:
    a tubular body defining an axial interior chamber and having a trailing end portion;
    means to create sonic effects including a strip of resilient material secured within, and spanning under tension, the interior chamber in a position to react vibrasonically to the movement of water axially through said interior chamber; and
    a plurality of hooks connected to, and disposed in a spaced relation about, a periphery of the trailing end portion of the tubular body.

14. The fishing lure of claim 13, wherein each hook includes a shank overlying and connected on outer face of the trailing end portion periphery of the tubular body and includes a curved barb bearing segment extending rearwardly beyond said trailing end portion.

15. The fishing lure of claim 13, which includes a plurality of holes in the tubular body in spaced relation thereabout.

16. The fishing lure of claim 15, wherein the resilient material secured within, and spanning under tension, the interior chamber further comprises:
    an elastic member, having a central span portion disposed between two shoulders, said shoulders in engagement with outer surfaces of the tubular body in proximity with the holes therein.

17. The fishing lure of claim 13, wherein the resilient material is an elastic strip member having end loops, with a first end loop placed over one hook, a central portion of said elastic strip member inserted through the holes in the tubular body and a second end loop of the elastic strip member placed over a second hook.

18. The fishing lure of claim 17 wherein the elastic strip member is a conventional rubber band.

* * * * *